United States Patent
Kong et al.

(10) Patent No.: US 7,732,355 B2
(45) Date of Patent: Jun. 8, 2010

(54) WATER-VAPOR PERMEABLE FILMS AND TEXTILES

(75) Inventors: Dan-Cheng Kong, Hsinchu (TW); Lien Tai Chen, Taoyuan County (TW); Ruei-Shin Chen, Changhua County (TW)

(73) Assignee: Industrial Technology Research Institute, Hsinchu, Taiwan (CN)

( * ) Notice: Subject to any disclaimer, the term of this patent is extended or adjusted under 35 U.S.C. 154(b) by 898 days.

(21) Appl. No.: 11/355,155

(22) Filed: Feb. 16, 2006

(65) Prior Publication Data
US 2007/0149074 A1 Jun. 28, 2007

(30) Foreign Application Priority Data
Dec. 27, 2005 (TW) .............................. 94146689 A

(51) Int. Cl.
B32B 27/04 (2006.01)
B32B 27/12 (2006.01)
B32B 5/02 (2006.01)

(52) U.S. Cl. .................... 442/79; 442/286; 442/294
(58) Field of Classification Search .......... 442/79, 442/286, 294
See application file for complete search history.

(56) References Cited

U.S. PATENT DOCUMENTS

| 4,429,000 A | 1/1984 | Naka et al. |
| 4,452,845 A * | 6/1984 | Lloyd et al. .................... 602/52 |
| 4,560,611 A | 12/1985 | Naka et al. |
| 4,877,856 A | 10/1989 | Hall et al. |
| 5,254,641 A | 10/1993 | Alex et al. |
| 5,283,112 A | 2/1994 | Krishnan |
| 5,520,998 A | 5/1996 | Uemoto et al. |
| 6,001,464 A | 12/1999 | Schultze et al. |
| 6,774,065 B2 | 8/2004 | Haruta et al. |
| 6,790,926 B1 | 9/2004 | Spijkers et al. |
| 6,984,709 B2 * | 1/2006 | Meltzer et al. ................. 528/76 |
| 2003/0195293 A1 | 10/2003 | Lubnin et al. |
| 2003/0207640 A1 * | 11/2003 | Anderson et al. ........... 442/394 |
| 2004/0091693 A1 * | 5/2004 | Thomas et al. ........... 428/317.9 |
| 2004/0092696 A1 | 5/2004 | Vedula et al. |
| 2004/0142621 A1 * | 7/2004 | Carroll et al. ............... 442/394 |

FOREIGN PATENT DOCUMENTS

| DE | 43 39 475 A1 | 5/1995 |
| DE | 44 42 380 A1 | 5/1996 |
| EP | 0 335 276 A1 | 10/1989 |
| GB | 2 087 909 A | 6/1982 |
| GB | 2 157 703 A | 10/1985 |
| JP | 2000-220076 A | 8/2000 |
| WO | WO-90/00180 A1 | 1/1990 |
| WO | WO-90/00969 A1 | 2/1990 |

* cited by examiner

*Primary Examiner*—Norca L Torres-Velazquez
(74) *Attorney, Agent, or Firm*—Birch, Stewart, Kolasch & Birch, LLP

(57) ABSTRACT

A water-vapor permeable film. The film includes 90~99 wt % polyurethane (PU) and 1~10 wt % polyethylene (PE). The invention also provides a textile including the film.

22 Claims, No Drawings

WATER-VAPOR PERMEABLE FILMS AND TEXTILES

BACKGROUND OF THE INVENTION

1. Field of the Invention

The invention relates to a polymer material, and in particular to a water-vapor permeable film and a textile comprising the same.

2. Description of the Related Art

Thermoplastic polyurethane (TPU) is a soft elastomeric resin with high tensile strength, wearproof, low temperature resistance, and strong adhesion. The polyurethane, also meeting environmental requirements due to decomposability, with no use of solvent during processing, has been widely applied in textiles and ready-made clothes. In film processing, a thin (<20 μm) and uniform (±15%) film can be obtained using a blown film method.

When polyurethane film is rolled or pulled, film blocking may easily occur due to high surface friction force thereof, resulting in film breakage. Conventional addition methods are employed to solve the problem. Additive quantity, however, is large, increasing costs. Also, die-build-up may occur during fabrication due to water absorption of the polyurethane.

Thus, development of a water-vapor permeable film fabrication method with prevention of film blocking and die-build-up is desirable.

Current water-vapor permeable polyurethane fabrication methods mainly comprise adding hydrophilic functional groups to polymer structure. Other accessory methods such as adding absorbent powders, creating pores, forming cross-linking structure, or adding aromatic compounds also increase water-vapor permeability or film strength. There are many patents related to water-vapor permeable polyurethane, mainly comprising use of additives or film modification by back-end processing. Few, however, relate to film composition.

U.S. Pat. No. 6,790,926 discloses a water vapor permeable polyurethane, and fabrication and application thereof. The polyurethane comprises a polyether-polyol containing high weight percentage of ethylene oxide (comprising polyethylene glycol (PEG) and 4,4-methylene bisphenyl diisocyanate (MDI)), a small molecule chain extender, and an araliphatic diol. Addition of the araliphatic diol containing benzene structure increases resin strength and reduces adhesion between films.

US 2004/092,696 discloses a polyurethane comprising a polyether intermediate containing ethylene oxide (containing two terminal hydroxyl functional groups) and a chain extender such as araliphatic diol. The polyurethane provides high melting temperature, high tensile strength, and antistatic electricity. This patent also discloses a textile combined with the polyurethane, capable of elongation, high water vapor permeability, thermal resistance, and processability.

US 2003/195,293 discloses an aqueous and water vapor permeable polyurethane comprising a polyol containing ethylene oxide. No emulsifying agent or amine neutralizer is required during water dispersion due to formation of the hydrophilic ethylene oxide chains, preventing pollution from solvents or small molecule vaporized substances. Wound dressing materials or textiles combined therewith also provide high water vapor permeability. Additionally, film strength is improved by addition of other polymer materials.

JP 2000/220,076 discloses a solvent-based polyurethane containing at least 20 wt % ethylene oxide. To avoid over-concentration of ethylene oxide in soft segment, a diol chain extender containing ethylene oxide is further added to increase ethylene oxide content in hard segment. Thus, water vapor permeable groups are uniformly distributed in the polyurethane, increasing film strength.

DE 4,442,380 discloses a polyurethane comprising one or more polyether polyurethanes, one of which is a water vapor permeable polyethylene glycol polyurethane, and other polyurethanes selected by strength requirements. Ethylene oxide content and mixing ratio among polyether polyurethanes are defined. Polyester polyurethanes, however, are not suitable for use due to lower water vapor permeability.

DE 4,339,475 discloses a polyurethane having 35~60 wt % ethylene oxide comprising polyether-polyol. To facilitate coating, melting viscosity less than 70 is required. The small molecule chain extender comprises ether-diol and ester-diol. Large molecule polyester-polyol, however, is not used.

U.S. Pat. No. 5,254,641 discloses a water vapor permeable polyurethane film comprising a polyurethane containing polyethylene glycol (PEG) with a hardness of 75A~92A and 5~20 wt % polyether-amide or polyether-ester. Film strength can be effectively improved by addition of the polyether-amide or polyether-ester.

U.S. Pat. No. 5,283,112 discloses a polyurethane comprising a hydrophilic polyethylene glycol (PEG) and a hydrophobic polydimethyl siloxane (PDMS). During fabrication, phase separation is more complete due to different hydrophilicity of components, resulting in stronger film. Also, softness of polyurethane and its adhesion to substrate can be improved by addition of PDMS.

EP 335,276 discloses a water vapor permeable non-yellowing polyurethane comprising an aliphatic or cyclo-aliphatic diisocyanate, a polyether-polyol containing ethylene oxide, and a diol. The soft polyurethane having optimal physical modulus can be obtained, suitable for use in extrusion processing.

GB 2,087,909 discloses a solvent-based polyurethane. A short-chain diol is first mixed with exceeding duisocyanate to form a pre-polymer. Next, a polyethylene glycol (PEG) is added thereto. A polyurethane containing 25~40 wt % polyethylene glycol is thus formed. Film strength is improved by addition of the longer hard segment pre-polymer comprising the diol and diisocyante.

WO 9,000,969, WO 9,000,180, and GB 2,157,703 disclose a two-component or pre-polymer-type polyurethane comprising a polyether-polyol such as polyethylene glycol (PEG), a chain extender, and a cross-linking reagent. The resulting polyurethane has exceeding NCO and provides low viscosity. Additionally, film strength is increased by formation of cross-linking structure.

BRIEF SUMMARY OF THE INVENTION

The invention provides a thermoplastic water-vapor permeable film comprising 90~99 wt % polyurethane (PU) and 1~10 wt % polyethylene (PE). The film comprises single or multiple layers.

The invention also provides a water-vapor permeable textile comprising a fabric with the disclosed water-vapor permeable film laminated thereonto with an adhesive.

A detailed description is given in the following embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a thermoplastic water-vapor permeable film comprising 90~99 wt % polyurethane (PU) and 1~10 wt % polyethylene (PE). The film may be single or multiple layers with co-extrusion structure.

The thermoplastic water-vapor permeable film may be a single layer comprising 90~99 wt % polyurethane (PU) and 1~10 wt % polyethylene (PE).

The thermoplastic water-vapor permeable film may be a double layer such as A/B. A layer may comprise 90~99 wt % polyurethane (PU) and 1~10 wt % polyethylene (PE). B layer may comprise 90~99 wt % polyurethane (PU), 1~10 wt % polyethylene (PE), 1,000~2,000 ppm anti-block, and 500~2,000 ppm migratory slip additive.

The thermoplastic water-vapor permeable film may be a triple layer such as A/B/A. A layer may comprise 90~99 wt % polyurethane (PU) and 1-10 wt % polyethylene (PE). B layer may comprise polyurethane (PU) and 500-2,000 ppm migratory slip additive.

The polyurethane is thermoplastic polyurethane comprising hard segment and soft segment. The hard segment may comprise aromatic polyisocyanate such as 4,4-methylene bisphenyl diisocyanate (MDI) or toluene diisocyanate (TDI). The soft segment may comprise polyether-polyol such as polyethylene glycol (PEG), polypropylene glycol (PPG), polytetramethylene glycol (PTMG) or 1,4-butane diol (1,4-BD), or polyester-polyol such as poly(1,4-butylene adipate) (PBA). In the polyurethane, the hard segment and soft segment have a ratio of about 0.5~0.8. Preferably, the polyurethane has a NCO/OH ratio of about 0.9~1.2.

The thermoplastic polyurethane may comprise hydrophilic polyether-polyol, aromatic polyisocyanate, or aliphatic polyester-polyol. In the polyurethane, the polyether-polyol has a weight ratio of about 20~60%. The polyurethane has a NCO/OH ratio of about 0.9~1.2.

The polyethylene may comprise branch polyethylene such as low density polyethylene (LDPE) or liner polyethylene such as liner low density polyethylene (LLDPE) of density of about 0.915~0.940 g/cm$^3$ or high density polyethylene (HDPE) of density of about 0.941~0.970 g/cm$^3$, or a combination thereof.

Preferably, the polyethylene has a weight ratio of about 1~8%, most preferably 2~7%. The film further comprises 500~3,000 ppm anti-block, preferably 1,000~2,000 ppm, or 500~2,000 ppm slip additive. The anti-block may comprise silica, aluminum silicate, magnesium silicate, calcium carbonate, clay, crosslinked silicone sphere, crosslinked spherical particles of polymethyl methacrylate copolymer, or a combination thereof. The slip additive may comprise silicone gum, wax, polydiallyl siloxane or fatty amides such as erucamide and oleamide.

The film is non-porous and has a thickness of 5~100 µm, preferably, 8~50 µm, most preferably 10~30 µm, a water-vapor permeability exceeding 500 g/m$^2$/day (test method JIS1099A-2), an elastic recovery exceeding 75% (test method DIN53835), and an elongation to break exceeding 300% (test method ASTMD412).

In the invention, polyethylene with no water absorption and low surface friction force is added to the polyurethane to prevent film blocking and die-build-up during film fabrication, increasing yield. Additionally, the water-vapor permeability of the polyurethane can be maintained due to less polyethylene added. Also, the anti-block is used as a lubricant to avoid film blocking.

In subsequent blown film processing, the blow-up ratio is about 1.5~3.0, preferably 2.0.

Additionally, the fabrication method of the water-vapor permeable film may also comprise cast film or extrusion coating.

The invention also provides a textile comprising a fabric with the disclosed water-vapor permeable film laminated thereonto with an adhesive exhibiting a non-continuous distribution.

The fabric may be woven, knitted, or non-woven. The textile can be widely applied in clothes, automobile industry, medical articles, sport articles, bedding, or glass industry.

EXAMPLE 1

The water-vapor permeable film was fabricated by blown film processing. The blow-up ratio was 2.0 and the thickness of the film was 15 µm. The film comprised 95 wt % thermoplastic polyurethane having a hard segment/soft segment ratio of 0.61, 5 wt % low density polyethylene having a density of 0.923 g/cc, and 1000 ppm anti-block. The film had water-vapor permeability of 2,854 g/m$^2$/day, elastic recovery of 89%, and elongation to break about 730%.

EXAMPLE 2

The water-vapor permeable film was fabricated by blown film processing. The blow-up ratio was 2.0 and the thickness of the film was 10 µm. The film comprised 95 wt % thermoplastic polyurethane having a hard segment/soft segment ratio of 0.61, 5 wt % low density polyethylene having a density of 0.923 g/cc, and 1000 ppm anti-block. The film had water-vapor permeability of 3,223 g/m$^2$/day, elastic recovery of 93%, and elongation to break about 700%.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A water-vapor permeable film comprising:
   90-99 wt % thermoplastic polyurethane (TPU) comprising hard segment and soft segment with a ratio of about 0.5-0.8 there between, and
   1-10 wt % high density polyethylene (HDPE) of density of about 0.941-0.970 g/cm$^3$;
   wherein the hard segment of the thermoplastic polyurethane (TPU) comprises aromatic polyisocyanate comprising 4,4-methylene bisphenyl diisocyanate (MDI) or toluene diisocyanate (TDI) and the soft segment of the thermoplastic polyurethane (TPU) comprises polyether-polyol comprising polyethylene glycol (PEG), polypropylene glycol (PPG), or polytetramethylene glycol (PTMG).

2. The water-vapor permeable film as claimed in claim 1, wherein the polyethylene has a weight ratio of about 1-8%.

3. The water-vapor permeable film as claimed in claim 1, wherein the polyethylene has a weight ratio of about 2-7%.

4. The water-vapor permeable film as claimed in claim 1, further comprising polyester-polyol.

5. The water-vapor permeable film as claimed in claim 4, wherein the polyester-polyol comprises poly(1,4-butylene adipate) (PBA).

6. The water-vapor permeable film as claimed in claim 1, further comprising anti-block.

7. The water-vapor permeable film as claimed in claim 6, wherein the anti-block has a quantity of about 500-3,000 ppm.

8. The water-vapor permeable film as claimed in claim 6, wherein the anti-block comprises silica, aluminum silicate, magnesium silicate, calcium carbonate, clay, crosslinked silicone sphere, crosslinked spherical particles of polymethyl methacrylate copolymer, or a combination thereof.

9. The water-vapor permeable film as claimed in claim 1, further comprising slip-additive.

10. The water-vapor permeable film as claimed in claim 9, wherein the slip-additive comprises silicone gum, wax, polydiallyl siloxane, fatty amides, or a combination thereof.

11. The water-vapor permeable film as claimed in claim 1, wherein the film has a thickness of about 5-100 μm.

12. The water-vapor permeable film as claimed in claim 1, wherein the film has a thickness of about 8-50 μm.

13. The water-vapor permeable film as claimed in claim 1, wherein the film has a thickness of about 10-30 μm.

14. The water-vapor permeable film as claimed in claim 1, wherein the film is non-porous.

15. The water-vapor permeable film as claimed in claim 1, wherein the film has a water-vapor permeability exceeding 500 $g/m^2/day$.

16. The water-vapor permeable film as claimed in claim 1, wherein the film has an elastic recovery exceeding 75%.

17. The water-vapor permeable film as claimed in claim 1, wherein the film has an elongation to break exceeding 300%.

18. The water-vapor permeable film as claimed in claim 1, wherein the water-vapor permeable film is fabricated by blown film, cast film, or extrusion coating.

19. A water-vapor permeable textile, comprising
a fabric; and
a water-vapor permeable film as claimed in claim 1, laminated onto the fabric with an adhesive.

20. The water-vapor permeable textile as claimed in claim 19, wherein the fabric is woven, knitted, or non-woven.

21. The water-vapor permeable textile as claimed in claim 19, wherein the adhesive exhibits a non-continuous distribution.

22. The water-vapor permeable textile as claimed in claim 19, wherein the textile is applied in clothes, automobile industry, medical articles, sport articles, bedding, or glass industry.

* * * * *

UNITED STATES PATENT AND TRADEMARK OFFICE
CERTIFICATE OF CORRECTION

PATENT NO. : 7,732,355 B2
APPLICATION NO. : 11/355155
DATED : June 8, 2010
INVENTOR(S) : Kong et al.

Page 1 of 1

It is certified that error appears in the above-identified patent and that said Letters Patent is hereby corrected as shown below:

Title Page, Item (73) Assignee's residence:

"Industrial Technology Research Institute, Hsinchu Taiwan (CN)" should be changed to
--Industrial Technology Research Institute, Hsinchu (TW)--

Signed and Sealed this
Eighteenth Day of November, 2014

Michelle K. Lee
*Deputy Director of the United States Patent and Trademark Office*